United States Patent [19]

Pronk

[11] Patent Number: 4,502,946
[45] Date of Patent: Mar. 5, 1985

[54] PROCESS FOR THE COMPLETE REPLACEMENT OF PARTICLES IN VESSELS

[75] Inventor: Gerrit J. Pronk, The Hague, Netherlands

[73] Assignee: Shell Oil Company, Houston, Tex.

[21] Appl. No.: 594,131

[22] Filed: Mar. 28, 1984

[30] Foreign Application Priority Data

Mar. 28, 1983 [GB] United Kingdom ............... 8308473

[51] Int. Cl.³ .................................... C10G 45/00
[52] U.S. Cl. .................................... 208/152; 208/213; 208/251 H; 208/171
[58] Field of Search ............... 208/152, 251 H, 213, 208/171, 173

[56] References Cited

U.S. PATENT DOCUMENTS

| | | | |
|---|---|---|---|
| 3,207,689 | 9/1965 | Van Driesen | 208/152 |
| 3,410,791 | 11/1968 | Perry et al. | 208/152 |
| 4,059,502 | 11/1977 | James | 208/152 |
| 4,338,187 | 7/1982 | Gartside et al. | 208/153 |

FOREIGN PATENT DOCUMENTS

| | | | |
|---|---|---|---|
| 1331935 | 12/1970 | United Kingdom | 208/152 |
| 2014058 | 1/1979 | United Kingdom | 208/152 |

*Primary Examiner*—Delbert E. Gantz
*Assistant Examiner*—Anthony McFarlane
*Attorney, Agent, or Firm*—John M. Duncan

[57] ABSTRACT

Process for the complete replacement under operating conditions of particles in a vessel provided with a feed inlet and, if desired, a separate particle inlet, a particle outlet and an effluent outlet, wherein part of the feed passing through the vessel during withdrawal of particles is by-passing the vessel when the particles still present in the vessel do not occupy more than 20% v of the volume initially occupied by particles and the feed is passed through the vessel before or during the addition of fresh particles.

The process is particularly suitable for the complete replacement under operating conditions of spent hydrodemetallization catalysts.

8 Claims, 1 Drawing Figure

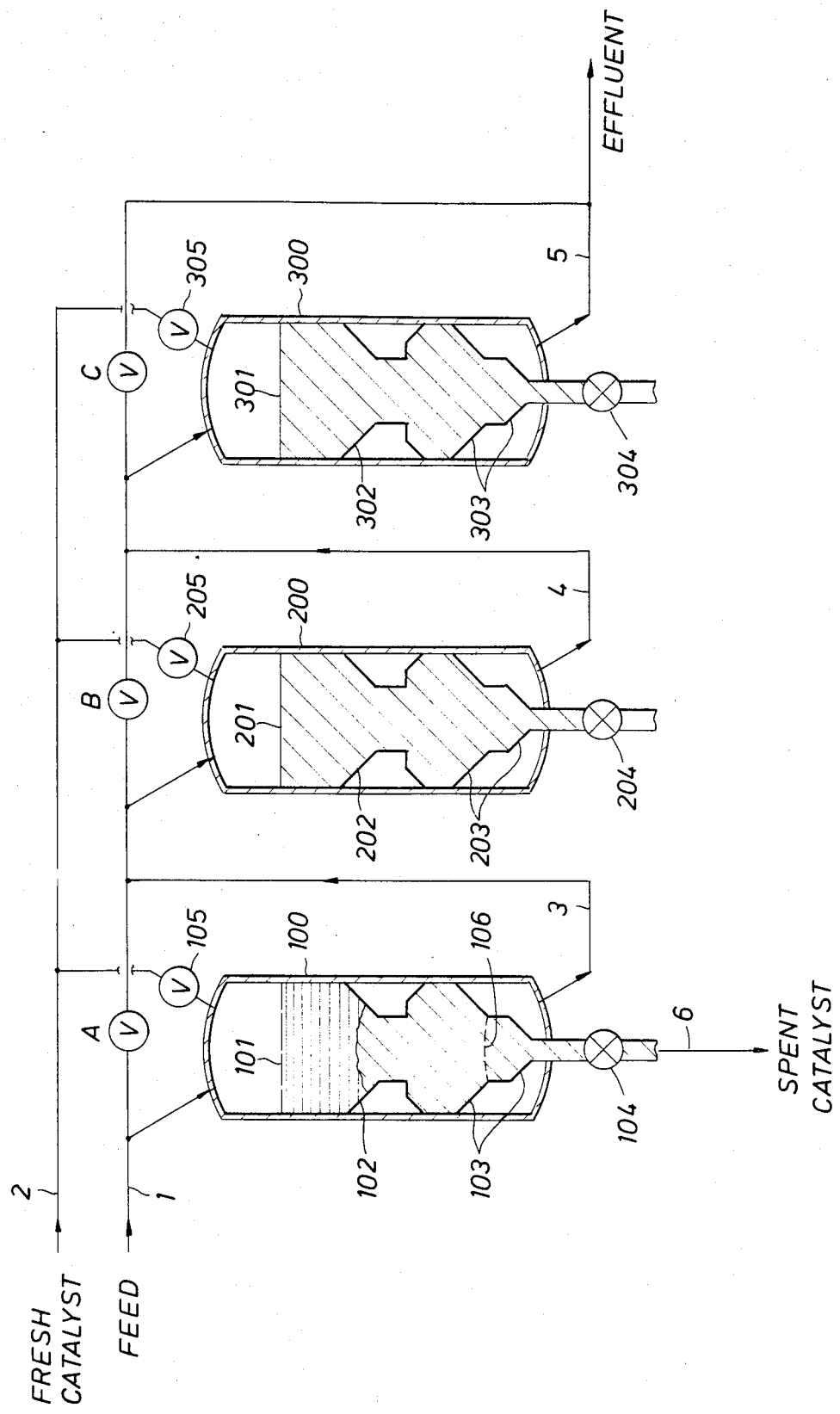

PROCESS FOR THE COMPLETE REPLACEMENT OF PARTICLES IN VESSELS

BACKGROUND OF THE INVENTION

The present invention relates to a process for the complete replacement of particles in a vessel. The present invention relates in particular to a process for the complete replacement of catalyst particles used in the catalytic treatment of hydrocarbon oils such as demetallization, desulfurization and hydroconversion.

Since the feedstocks normally applied in oil processes, such as atmospheric and vacuum residues contain both metals such as nickel and vanadium as well as sulfur compounds, pre-treatments like (hydro)demetallization and (hydro)desulfurization are required to improve the quality of the feedstock prior to further conversion envisaged.

Catalysts play a very important role in hydroprocessing. Proper fluid flow is desired to make full use of a catalyst's particular properties. The life of a catalyst in residue hydroprocessing units is limited mainly due to the deposition of metals. Therefore, the catalyst has to be replaced at certain intervals by a fresh charge, the spent charge either being discarded or regenerated in a separate operation. It will be clear that the replacement of catalysts is carried out preferably as late as possible and, moreover, with a minimum down-time of the reactor concerned.

Quick catalyst replacement operations have been suggested in the art (e.g., British Patent Specification No. 1,500,213) and can be applied successfully, but they have to be carried out while the reactor concerned is taken off-stream and has to be depressurized and cooled down to ambient temperature.

On-stream replacement of catalyst charges can be carried out in moving-bed or bunker reactors (e.g., as described in British Patent Specification No. 1,331,935). The replacement occurs gradually and can be carried out continuously or periodically in bunker reactors equipped for mass-flow behavior of the catalyst charge. Mass-flow behavior of the solids present is normally obtained by resting the catalyst bed(s) on one or more conical supports having in the center a catalyst outlet duct leading to a sluicing system. Since catalyst replacement is carried out on-stream, the addition of fresh catalyst also requires the presence of a sluicing system.

It may be necessary for various reasons, however, to replace the complete charge of a catalyst or catalyst/carrier mixture present in a reactor while maintaining the reactor under operating conditions. This can be accomplished successfully when a number of reactors is operated in series, provided the reactor to be refilled with catalyst is temporarily disconnected from the supply and removal lines for the hydrocarbon feeds and effluents (e.g., British Patent Specification No. 2,014,058).

However, in carrying out this replacement operation, the main feed to the reactor has to be stopped and additional hot purge gas (e.g., hydrogen at a temperature of about 350° C.) has to be purged through the reactor in order to prevent temperature excursions. The consequence of the use of a purge gas is, however, the presence of a complicated valve handling procedure around the reactor(s) concerned together with an additional hot purge gas flow circuit, in size and thoughput comparable with the recycle gas flow normally employed.

It has now been found that complete replacement under operating conditions of particles in vessels provided with inlet(s) and outlets can be accomplished without the presence of an additional purge gas circuit when the flow of feed through the vessel is controlled carefully during the catalyst withdrawal procedure.

SUMMARY OF THE INVENTION

The present invention thus relates to a process for the complete replacement under operating conditions of particles in a vessel provided with a feed inlet and, if desired, a separate particle inlet, a particle outlet and an effluent outlet wherein part of the feed passing through the vessel during withdrawal of particles is by-passing the vessel when the particles still present in the vessel do not occupy more than 20% v of the volume initially occupied by particles and the feed is passed through the vessel before or during the addition of fresh catalyst.

BRIEF DESCRIPTION OF DRAWING

FIG. 1 is a schematic flow sheet illustrating the basic process of the invention.

DETAILED DESCRIPTION OF THE INVENTION

The process according to the present invention is carried out preferably in such a way that part of the feed passing through the vessel during withdrawal of particles is by-passing the vessel when the particles still resent in the vessel do not occupy more than 10% v of the volume initially occupied by particles.

The process according to the invention is carried out conveniently when part of the feed by-passing the vessel during withdrawal of particles, in particular spent catalyst particles, is fed to one or more further vessels under operating conditions, in particular under similar operating conditions as the vessel being replenished with (catalyst) particles.

In practice, spent catalysts used in hydroprocessing residual material such as (hydro)demetallization, (hydro)desulfurization and hydroconversion, can now be completely replaced. The main advantage is that the feed to be processed travels through the vessel in which catalyst charge is being withdrawn during a substantial amount of the total catalyst withdrawal procedure so that temperature excursions are kept under control or even prevented (the feed passing through being an effective cooling medium) since the amount of catalyst present is reduced continuously during the withdrawal.

The process of by-passing the reactor at the final stage of the catalyst withdrawal procedure has the important advantage that the pressure drop over the reactor is gradually reduced as far as possible, thus minimizing pressure disturbances in the process. In particular, the undesired effect of pinning (i.e., the formation of a stagnant zone in which the particles no longer move adjacent to screens forming the particle/fluid separation section) is controlled.

Feeds which can be used in the process according to the invention comprise, for instance, hydrocarbon oils, especially hydrocarbon oils which are to be subjected to a demetallization and/or desulfurization treatment. As examples may be mentioned crude oil, oil from which the volatile products are removed (topped crude oil), oil from which light products are removed by distillation at atmospheric pressure (long residue), shale oils as well as oils obtained from tar sands. Residual fractions as described hereinabove are preferred feeds.

The particles to be replaced can be, for instance, spent or partly spent demetallization or desulfurization catalysts. Demetallization catalysts usually consist of oxidic carriers on which one or more metals or metal compounds with hydrogenation activity may be deposited. Reference is made to catalysts as disclosed in Netherlands patent specification 7309387 containing at least one metal of the group consisting of nickel and cobalt, at least one metal of the group consisting of molybdenum, vanadium and tungsten, supported on a carrier and fulfilling in fresh condition the following requirements:

(1) $p/d > 3.5-0.02v$, where p represents the specific average pore diameter in nm, d represents the specific average particle diameter in mm and v is the percentage of the total pore volume consisting of pores having a diameter above 100 nm,
(2) the total pore volume is above 0.40 ml/g,
(3) v is below 50 and
(4) the specific surface area is above 100 m$^2$/g; in case the catalyst has such a p and d that the quotient p/d is above $3.5-0.02v$, but at most $10-0.15v$, the fresh catalyst must fulfill the following additional requirements:
  (a) the nitrogen pore volume is above 0.60 m/g,
  (b) the specific surface are is above 150 m$^2$/g and
  (c) p is above 5 nm.

The values to be used for p, d, v, the total pore volume, the nitrogen pore volume and the specific surface area must be determined as described in the afore-mentioned Netherlands patent specification. Alumina, silica and silica-alumina are very suitable as carriers. Preference is given to carriers completely or substantially consisting of silica.

Catalysts as described in Netherlands patent specification 7316396 (U.S. Pat. No. 3,920,538) containing 0.1-15 parts by weight of the metal combination nickel-vanadium per 100 parts by weight of a silica carrier, having a loss on ignition, determined under standard conditions, of less than 0.5% by weight are very suitable. Also catalysts described in Netherlands patent specification 7412155 having a pore volume, present in pores having a diameter above 50 nm, of at least 0.2 ml/g and obtained by the nodulizing technique can be used conveniently. Silica on which no metals with hydrogenation activity have been deposited, as described in Netherlands patent specification 7607552, can be used when the hydrocarbon oil to be demetallized has a high metal content.

The hydrotreatment, in particular the hydrodemetallization of hydrocarbon oils (normally at least 80 vol.% being in the liquid state) is conveniently carried out by passing them together with hydrogen in downward direction over the appropriate catalyst at a temperature between 300° and 450° C. (preferably between 350° and 425° C.), a total pressure between 75 and 250 bar (preferably between 100 and 200 bar), a hydrogen partial pressure between 35 and 200 bar (preferably between 50 and 175 bar), a space velocity of 0.1-25 parts by volume of fresh feed per part by volume of catalyst per hour and a hydrogen/feed ratio of 500-2000 (preferably 750-1500) Nl of H$_2$/kg of feed.

The hydrogen required for the hydrotreatment may be a hydrogen-containing gas stream, such as a reformer off-gas stream, or a mainly pure hydrogen. The hydrogen-containing gases preferably contain at least 60% by volume of hydrogen. The demetallization need of course not be complete and a quantity of metal may still be present in the treated product.

It may be attractive to subject the resultant demetallized hydrocarbon oil to a hydrodesulfurization treatment and it is advantageous to carry out the demetallization and desulfurization in one continuous treatment with intermediate isolation and/or purification of the demetallized hydrocarbon oil and of the hydrogen-containing gas becoming available.

For the hydrodesulfurization of heavy hydrocarbon fractions, such as residual fractions, specific catalysts are known which can be used for a long time without replacement or regeneration of the catalyst being necessary as a result of deposition of metals, coke and high-molecular components (such as resins, polyaromatics and asphaltenes) from the feed. Reference is made to catalysts described in Netherlands patent specification 7010427. The particles of said catalysts have a pore volume above 0.30 ml/g, of which pore volume less than 10% is present in pores having a diameter above 100 nm and the catalyst particles have a specific pore diameter expressed in nm from $7.5 \times d^{0.9}$ to $17 \times d^{0.9}$, in which d represents the specific particle diameter in mm.

Catalysts which can be suitably employed include sulfur-resistant catalysts comprising one or more of Group VIB, VIIB and/or VIII metals, their sulfides or oxides deposited on an amorphous refractory inorganic oxide of Group II, III or IV elements, or a composition of said inorganic oxides. Catalyst containing nickel or cobalt together with molybdenum are particularly suitable. Very suitable carriers are silica, silica-alumina and in particular alumina.

The hydrodesulfurization is carried out under the usual conditions. The demetallized hydrocarbon oil or a hydrocarbon oil having a very low metal content to be desulfurized together with fresh hydrogen and/or hydrogen already present is very suitably passed in downward direction over the catalyst at a temperature between 350° and 425° C., a total pressure between 100 and 250 bar, a hydrogen partial pressure between 50 and 175 bar, a space velocity of 0.1-20 parts by volume of fresh feed per part by volume of initial catalyst per hour and a hydrogen/feed ratio of 500-1500 Nl H$_2$/kg of feed.

The (catalyst) particles to be replaced completely will normally be present in apparatuses suitable for (catalytic) processes, in particular in reactors having an external or internal geometry which ensures mass flow of the (catalyst) particles. Reactors which can be used conveniently in residue hydroprocessing are so-called bunker or moving-bed reactors. The catalyst bed(s) in the reactor rest on conical supports having in the center a catalyst outlet duct as will be described hereinafter.

Preferred apparatuses which can be used in the catalytic treatment of hydrocarbons wherein a complete catalyst replacement is required comprise reactors which contain at least one tray in addition to supporting means for one or more catalyst beds, which supporting means are permeable to liquid and gas and impermeable to catalyst particles and in which the supporting means are at least partly in the shape of a conical surface of a truncated cone and which supporting means are attached to the wall of the reactor and are provided with a downward-directed opening permeable to catalyst particles and in which beneath each supporting means a tray is located which is permeable to liquid and gas and impermeable to catalyst particles which tray has an opening which is permeable to catalyst particles. The supporting means are positioned preferably in such a way that the acute angle formed by a descriptive line of the conical surface(s) and the axis of the reactor is from 35°–45°.

The pertaining FIG. 1 is a schematic drawing of an apparatus which can be used for carrying out the replacement according to the present invention. It will be clear that the complete replacement of a catalyst charge will be carried out in one reactor at the time. The other reactors depicted in FIG. 1 illustrate that the complete replacement is part of a multi-reactor system as is preferably employed in large scale operations.

Referring to FIG. 1, 100, 200 and 300 are three reactors which under normal operating conditions (when no (catalyst) particles are replaced) are provided with the appropriate (catalyst) particles up to the levels 101, 201, 301, respectively. The feed, for instance a heavy hydrocarbon oil to be hydro-demetallized, is supplied via line 1 to the top of reactor 100 and is lead over the appropriate catalyst particles (shaded area) supported by supporting means 102 and 103 having downward-directed openings for the passage of catalyst. The stream of treated feed leaves reactor 100 by passing through the liquid and gas permeable guide-face 103 and enters reactor 200 via line 3 and enters reactor 300 via line 4. The effluent leaving reactor 300 is removed via line 5 for further processing such as distillation and, if desired, partial recycle of top and/or bottom fractions to earlier stages in the process.

(Catalyst) particles can be supplied via line 2 but under normal operation this will not take place since the valves 105, 205 and 305 are closed. It should be noted that it may not be necessary to equip the reactors with individual supply lines when the (catalyst) particles can be supplied via a connection (not shown) to the feed supply line 1. On the other hand, it may be useful to employ a separate (catalyst) supply line in case different layers of (catalyst) particles are required to fill up the allotted (catalyst) particles space. During normal operation the feed is directly introduced into the first reactor—and through the first reactor to the next—since the by-pass valves A, B and C are closed.

By opening valve 104, preferably a rotary valve, the unloading of (catalyst) particles from reactor 100 commences (while the main process flow continues to flow through reactor 100) and spent (catalyst) particles are removed via line 6 and may be discarded or directed to a regeneration unit. When the unloading of the catalyst has proceeded to the stage that catalyst occupies not more than 20% of the volume initially occupied by catalyst (indicated as a percentage of the shaded area in the similar reactor 200, e.g., as indicated by broken line 106), valve A is opened which allows the main process flow to proceed directly to reactor 200. Valve 104 remains opened until the remainder of the (catalyst) particles has been withdrawn from the reactor. Thereafter valve 104 is closed and by-pass valve A is closed so that the process flow enters reactor 200 again via line 3, i.e., after having passed through reactor 100 totally devoid of catalyst.

The reloading of reactor 100 is carried out while the process flow is continued through reactor 100 by either opening valve 105 to allow for the introduction of (catalyst) particles (either as such, or, preferably, in a slurry in a suitable liquid such as a hydrocarbon), or by transporting the (catalyst) particles in the main process flow through line 1. When the level of the catalyst bed has reached the appropriate level (indicated as 101), the (catalyst) charge of reactor 200 can be replaced by carrying out a similar operation. Valves A, B and C are closed when valve 204 is opened to allow withdrawal of catalyst from reactor 200. When the unloading of reactor 200 has proceeded to the stage that the catalyst does not occupy more than 20% of the volume initially occupied by catalyst, valve B is opened which allows the main process flow to proceed directly to reactor 300.

Valve 204 remains open until the catalyst has been withdrawn totally from reactor 200. Thereafter, valve 204 is closed and by-pass valve B is closed so that the process flow again leaves reactor 200 via the liquid and gas permeable guide-face 203 and again enters reactor 300 via line 4. Reloading of the catalyst charge is carried out while the main process flow continues through reactor 200 either by opening valve 205 or by introducing the (catalyst) particles directly with the feed.

Replacement of the (catalyst) charge of any further reactors (only one reactor (300) depicted in FIG. 1) can be carried out in the same manner as described hereinabove.

The invention is illustrated by means of the following Example.

EXAMPLE

In an apparatus as described in FIG. 1, the reactors 100, 200 and 300 are filled with a demetallization catalyst. Said catalyst contains 0.6% by weight of nickel (as oxide) and 1.9% by weight of vanadium (as oxide) on silica as carrier and has a specific average pore diameter of 13.6 nm, a specific average particle diameter of 2.2 mm, a specific surface area of 262 m$^2$/g and a pore volume of 0.78 ml/g, of which pore volume 0.3% consists of pores having a diameter above 100 nm. A residue of a mineral oil having under reaction conditions a specific heat of 2 kJ/kg/°C. is subsequently passed through the reactors 100, 200 and 300 at a rate of 10 kg/s, a 300-inlet temperature of 400° C., together with hydrogen at a gas velocity of 1 Nm$^3$/kg of feed, which gas under reactor conditions has a specific heat of 25 kJ/kmol/°C. and a heat of reaction of 12 kJ/m$^3$ of catalyst/s.

When under normal operating conditions as described hereinabove a temperature increase of 10° C. is acceptable for a reaction proceeding at the given inlet temperature, the volume available for catalyst particles equals 26 m$^3$. In order to prevent a temperature increase of more than 10° C. when the catalyst is removed under operating conditions, 90% of the feed (i.e. 90% of the gas and 90% of the liquid) by-passes the reactor when the catalyst still present in the reactor equals 2.6 m$^3$, i.e., not more than 10%v of the total volume available for catalyst. When under otherwise similar conditions a temperature increase of 20° C. is acceptable, the by-pass of the reactor can be in operation when the remaining catalyst particles occupy 5.2 m$^3$ of the total volume available for catalyst particles, i.e., not more than 20%v of the total volume available for catalyst particles.

What is claimed is:

1. Process for the complete replacement under operating conditions of particles in a vessel provided with a feed inlet, a particle outlet and an effluent outlet, which comprises:

withdrawing particles from said vessel under operating conditions, including passing feed through the vessel during withdrawal of particles;

by-passing the vessel with a portion of the feed when the particle volume present in the vessel is no more than 20% of the initial particle volume;

withdrawing the remainder of the particles from the vessel;

closing off the feed by-pass and again passing all feed through said vessel;

while adding particles through a separate particle inlet or through the feed inlet to said vessel, until the desired particle volume is reached.

2. Process according to claim 1, characterized in that part of the feed passing through the vessel during withdrawal of particles is by-passing the vessel when the particles still present in the vessel do not occupy more than 10%v of the volume initially occupied by particles.

3. Process according to claim 1, characterized in that part of the feed by-passing the vessel during withdrawal of particles is fed to one or more further vessels under operating conditions.

4. Process according to claim 2, characterized in that part of the feed by-passing the vessel during withdrawal of particles is fed to one or more further vessels under operating conditions.

5. Process according to claim 1, characterized in that the particles being replaced comprise a catalyst charge of a (hydro)demetallization reactor.

6. Process according to claim 1, characterized in that particles being replaced comprise a catalyst charge of a hydrodesulfurization reactor.

7. Process according to claim 5, characterized in that the catalyst charge is withdrawn from a vessel containing at least one tray and supporting means for one or more catalyst beds, which supporting means is (are) permeable to liquid and gas and impermeable to catalyst particles and in which the supporting means is (are) at least partly in the shape of a conical surface of a truncated cone and is (are) attached to the wall of the vessel and is (are) provided with a downward-directed opening permeable to catalyst particles, and in which beneath each supporting means a tray is located which is permeable to liquid and gas and impermeable to catalyst particles, which tray has an opening which is permeable to catalyst particles.

8. Process according to claim 6, characterized in that the catalyst charge is withdrawn from a vessel containing at least one tray and supporting means for one or more catalyst beds, which supporting means is (are) permeable to liquid and gas and impermeable to catalyst particles and in which the supporting means is (are) at least partly in the shape of a conical surface of a truncated cone and is (are) attached to the wall of the vessel and is (are) provided with a downward-directed opening permeable to catalyst particles, and in which beneath each supporting means a tray is located which is permeable to liquid and gas and impermeable to catalyst particles, which tray has an opening which is permeable to catalyst particles.

* * * * *